United States Patent
Chang et al.

(10) Patent No.: US 10,345,637 B2
(45) Date of Patent: Jul. 9, 2019

(54) DISPLAY DEVICE AND METHOD FOR MANUFACTURING THE SAME

(71) Applicant: Samsung Electronics Co., Ltd., Gyeonggi-do (KR)

(72) Inventors: Min-Su Chang, Incheon (KR); Sung-Woon Yoon, Gyeonggi-do (KR); Kyo-Ree Lee, Seoul (KR); Duck-Yong Lee, Gyeonggi-do (KR); Young-Tae Jin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 14/460,293

(22) Filed: Aug. 14, 2014

(65) Prior Publication Data

US 2015/0049287 A1    Feb. 19, 2015

(30) Foreign Application Priority Data

Aug. 14, 2013    (KR) .................. 10-2013-0096485

(51) Int. Cl.
*G02F 1/1335*    (2006.01)
*G02F 1/1333*    (2006.01)

(52) U.S. Cl.
CPC .. *G02F 1/133512* (2013.01); *G02F 1/133308* (2013.01); *G02F 2001/133331* (2013.01); *G02F 2001/133388* (2013.01); *G02F 2202/28* (2013.01)

(58) Field of Classification Search
CPC .. G06F 3/0412; G02F 2202/28; G02F 1/1313; G02F 1/1335
See application file for complete search history.

(56) References Cited

U.S. PATENT DOCUMENTS

| 9,052,443 | B2 * | 6/2015 | Park | ................ | G02B 7/00 |
| 2011/0075397 | A1 * | 3/2011 | Hsu | ................ | G02B 6/0065 362/97.1 |
| 2011/0242467 | A1 * | 10/2011 | Kim | ................ | G02F 1/133308 349/113 |
| 2012/0105340 | A1 * | 5/2012 | Beom | ................ | G06F 3/041 345/173 |
| 2014/0184956 | A1 * | 7/2014 | Satou | ................ | G06F 3/041 349/12 |

FOREIGN PATENT DOCUMENTS

| KR | 10-2011-0019157 | 2/2011 |
| KR | 10-1224913 | 1/2013 |

* cited by examiner

Primary Examiner — Dung T Nguyen

(57) ABSTRACT

A display device includes a flat transparent plate, a display panel, at least one film, and a transparent adhesive layer. The display panel is separated below the transparent plate. The at least one film is disposed between the transparent plate and the display panel, and is attached to a lower peripheral region of the transparent plate. The transparent adhesive layer is disposed between the transparent plate and the display panel, and laminates the transparent plate and the display panel. Other various embodiments are possible.

13 Claims, 14 Drawing Sheets

DISPLAY DEVICE AND METHOD FOR MANUFACTURING THE SAME

PRIORITY

The present application is related to and claims the benefit under 35 U.S.C. § 119(a) of a Korean patent application filed in the Korean Intellectual Property Office on Aug. 14, 2013 and assigned Serial No. 10-2013-0096485, the entire disclosure of which is hereby incorporated by reference.

TECHNICAL FIELD

The present disclosure relates to a display device and a method for manufacturing the same.

BACKGROUND

Currently, with development of an electronic communication industry, User Equipment (UE) such as a cellular phone, an electronic scheduler, a Personal Digital Assistant (PDA), a laptop computer, and the like has become a necessity of a modern society, and plays an important role of transferring information changing fast. This UE provides a convenient operation environment to a user via a Graphic User Interface (GUI) and provides various multimedia based on a web environment.

Recently, a user prefers a slimmer UE meeting portability and an appearance design. However, the UE applies various functions and receives a plurality of electronic parts, such that there is a difficulty in manufacturing the UE in a slim profile.

SUMMARY

To address the above-discussed deficiencies, it is a primary object to provide a slim display device.

Another aspect of the present disclosure is to provide a slim electronic device.

In accordance with an aspect of the present disclosure, a display device includes a flat transparent plate. The display device also includes a display panel separated below the transparent plate The display device also includes at least one film disposed between the transparent plate and the display panel, and attached to a lower peripheral region of the transparent plate The display device also includes a transparent adhesive layer disposed between the transparent plate and the display panel, and laminating the transparent plate and the display panel.

In accordance with another aspect of the present disclosure, a method for manufacturing a display device includes removing a portion corresponding to a view area of a display panel from at least one film. The method also includes attaching the at least one film to a flat transparent plate. The method also includes laminating the display panel and the transparent plate.

A display device may be manufactured in a slim profile while expressing an elegant pattern on its peripheral region.

Other aspects, advantages and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
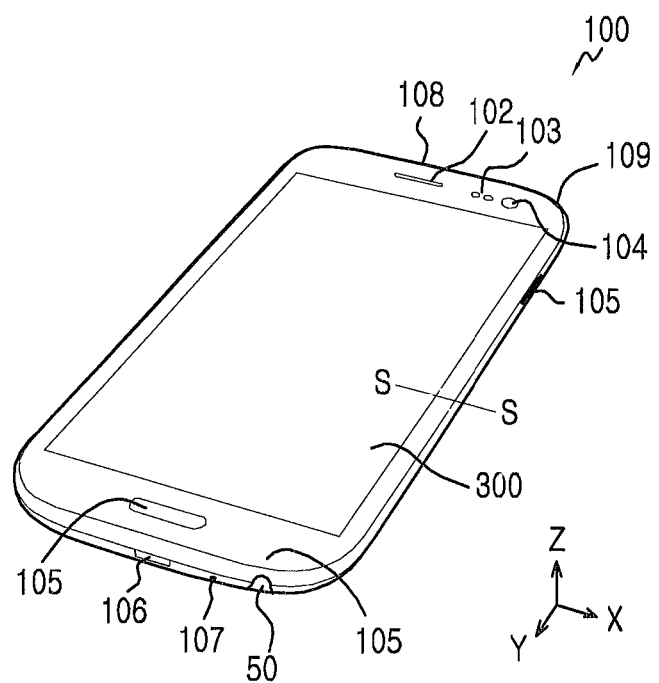
FIG. 1 illustrates a perspective view of an electronic device according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of example embodiments of the disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the disclosure. Also, in the drawings, like reference numerals are used for like elements.

An electronic device according to an embodiment of the present disclosure may be a device including a communication function. For example, the electronic device may be one of or a combination of one or more of various devices such as a smartphone, a tablet Personal Computer (PC), a mobile phone, a video telephone, an e-book reader, a desktop PC, a laptop PC, a netbook computer, a Personal Digital Assistant (PDA), a Portable Multimedia. Player (PMP), an MP3 player, a mobile medical apparatus, an electronic bracelet, an electronic necklace, an electronic appcessory, a camera, a wearable device, an electronic clock, a wrist watch, a smart white appliance (ex: a refrigerator, an air conditioner, a cleaner, an artificial intelligence robot, a TV, a Digital Video Disk (DVD) player, an audio, an oven, an electronic range, a washing machine, an air purifier, an electronic frame, and the like), various medical apparatuses (ex: Magnetic Resonance Angiography (MRA), Magnetic Resonance Imaging (MRI), Computed Tomography (CT), a photographing apparatus, an ultrasonic apparatus, and the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, an automobile infotainment unit, an electronic equipment for ship (for example, a navigation unit for ship, a gyrocompass, and the like), an avionics, a security apparatus, electronic clothes, an electronic key, a camcorder, game consoles, a Head-Mounted Display (HMD), a flat panel display device, an electronic album, a furniture including a communication function or a portion of a building/structure, an electronic board, an electronic signature receiving device, a projector, and the like It is obvious to a person of ordinary skill in the art that the electronic device according to an embodiment of the present disclosure is not limited to the above-mentioned devices.

FIG. 1 illustrates a perspective view of an electronic device according to an embodiment of the present disclosure.

Referring to FIG. 1, the electronic device 100 may include a display device 300, a speaker 102, at least one sensor 103, a camera 104, at least one key 105, an external port 106, a microphone 107, a jack 108, an antenna 109, or a stylus 50.

The display device 300 may include a window and a display panel disposed under the window. The display panel displays an image, and this image may be shown via the transparent window. In the embodiment where a touch panel is additionally applied to the display device 300, touch reception may be also possible. In the embodiment where a pen sensor (ex: a digitizer) is additionally applied to the display device 300, touch reception by the stylus 50 may be also possible. The display device 300 enabling this touch reception may be called a touchscreen.

The speaker 102 may output an electric signal in the form of sounds.

At least one sensor 103 may measure a physical quantity or sense the operation state of the electronic device 100 to convert the measured or sensed information to an electric signal. The at least one sensor 103 may be mounted on a specific position. The at least one sensor 103 may include at least one of a gesture sensor, a proximity sensor, a grip sensor, a gyro sensor, an acceleration sensor, a geomagnetic sensor, a pressure sensor, a temperature/humidity sensor, a Hall sensor, a RGB (red, green, blue) sensor, an illuminance sensor, a living body sensor, an Ultra Violet (UV) sensor, and a stylus detector. The at least one sensor 103 may include an E-nose sensor (not shown), an Electromyography (EMG) sensor (not shown), an Electroencephalogram (EEG) sensor (not shown), an Electrocardiogram (ECG) sensor (not shown), or a fingerprint sensor, and the like.

The camera 104 is a device for shooting an image and a moving picture, and may include one or more image sensors, an image signal processor (ISP) (not shown), or a flash LED (not shown).

The key 105 may include a key button or a touch key. The key 105 may include a key for controlling a volume or a key for turning on/off power.

The external port 106 may be used as a High-Definition Multimedia Interface (HDMI), a Universal Serial Bus (USB), a projector, a D-subminiature (sub), or a port for charging.

The microphone 107 may convert sound to an electric signal.

The jack 108 may allow a plug such as an earphone, an ear set, and the like to be electrically connected. The jack 108 may be hidden by a cover when it is not in use.

The antenna 109 (ex: Digital Multimedia Broadcasting (DMB) antenna) may be taken out to the outside of the electronic device 100 and stretched.

The stylus 50 may be taken out to the outside of the electronic device 100. At least one sensor 103 (ex: acceleration sensor or stylus detector) may sense attachment/detachment of the stylus 50.

Figure 2:
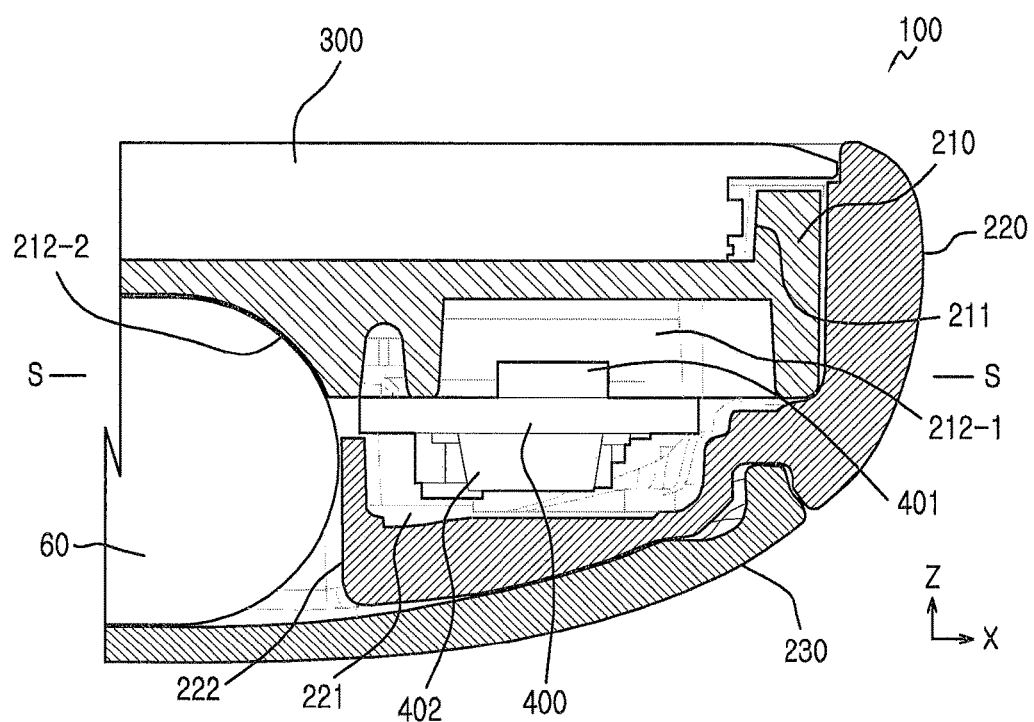
FIG. 2 illustrates a partial cross-sectional view of a portion corresponding to S-S of the electronic device according to an embodiment of the present disclosure.

FIG. 2 illustrates a partial cross-sectional view of a portion corresponding to S-S of the electronic device according to an embodiment of the present disclosure.

Referring to FIG. 2, the electronic device 100 may include a bracket 210, a backside case 220, a battery cover 230, the display device 300, a primary circuit board 400, or a battery 60.

The bracket 210 may be a mounting plate on which a plurality of electronic parts may be installed. The bracket 210 may be a frame for fixing and supporting a plurality of electronic parts (ex: the display device 300, the speaker 102, the at least one sensor 103, the camera 104, the at least one key 105, the external port 106, the microphone 107, the jack 108, the antenna 109, or the stylus 50). The bracket 210 may allow the display device 300 to be safely seated on its upper portion. The bracket 210 may allow the primary circuit board 400 to be safely seated on its lower portion. The bracket 210 may allow electronic parts that include a Printed Circuit Board (PCB) to be safely seated. The bracket 210 may allow electronic parts connected by the medium of an electric connection means (ex: a cable or a Flexible Printed Circuit Board (FPCB), and the like) to be safely seated. The bracket 210 may have a plurality of recesses for safely seating a plurality of parts. For example, the bracket 210 may have a recess 211 for safely seating the display device 300 in its upper portion. The bracket 210 may have a recess 212-1 for receiving electronic parts 401 protruding to the upper direction from the primary circuit board 400. The bracket 210 may have a battery receiving recess 212-2 which may receive a portion of a battery 60 and which is concave toward the upper direction. The bracket 210 may have a stylus receiving recess which may receive a portion of the stylus 50 (not shown) and which is concave toward the upper direction. The bracket 210 may be formed of non-metal or metal material. The bracket 210 may have a metal portion (ex: metal coating) that may be electrically connected with a ground of the primary circuit board 400.

The backside case 220 may be coupled (ex: snap-fit fastened or bolt-fastened) to the bracket 210. The backside case 220 may hide a plurality of parts (ex: the primary circuit board 400) fixed to the bracket 210. The bracket 210, the backside case 220, and the primary circuit board 400 may be coupled together using a bolt fastening method. The backside case 220 may have a recess 221 that may receive electronic parts 503 protruding toward the lower direction from the primary circuit board 400. The backside case 220 may have a battery through hole 222 for allowing the battery 60 to pass through it. In the embodiment where the bracket 210 and the backside case 220 are coupled, the battery receiving recess 212-2 of the bracket 210 and the battery through hole 222 of the backside case 220 may prepare a container-shaped space for attaching/detaching the battery 60. The backside case 220 may have a stylus receiving recess (not shown) which may receive a portion of the stylus 50 and which is concave toward the lower direction. In the embodiment where the bracket 210 and the backside case 220 are coupled, the stylus receiving recess of the bracket 210 and the stylus receiving recess of the backside case 220 may prepare a space for receiving the stylus 50.

The battery cover 230 may be coupled to and detached from the backside case 220. The battery cover 230 may have a plurality of hooks (not shown) that may be fastened to a plurality of hook fasten recesses of the backside case 220 on its periphery. In the embodiment where all of the bracket 210, the backside case 220, and the battery cover 230 are coupled, the bracket 210 may not be exposed, a portion of the backside case 220 may form the lateral side of the electronic device 100, and the battery cover 230 may form the backside of the electronic device 100.

The display device 300 may be attached on the upper portion of the bracket 210. The display device 300 may be electrically connected with the primary circuit board 400, and display a signal from the primary circuit board 400 in the form of an image. The display device 300 is described with reference to FIG. 3.

The primary circuit board 400 (ex: mainboard or mother hoard) is a substrate mounting a basic circuit and a plurality of electronic parts thereon, and may set an execution environment of the electronic device 100, maintain information thereof, stably drive the electronic device 100, and allow swift data input/output exchange of all devices of the electronic device 100. The primary circuit board 400 may be coupled to the lower portion of the bracket 210 using a fastening method such as a bolt, and the like.

Figure 3:
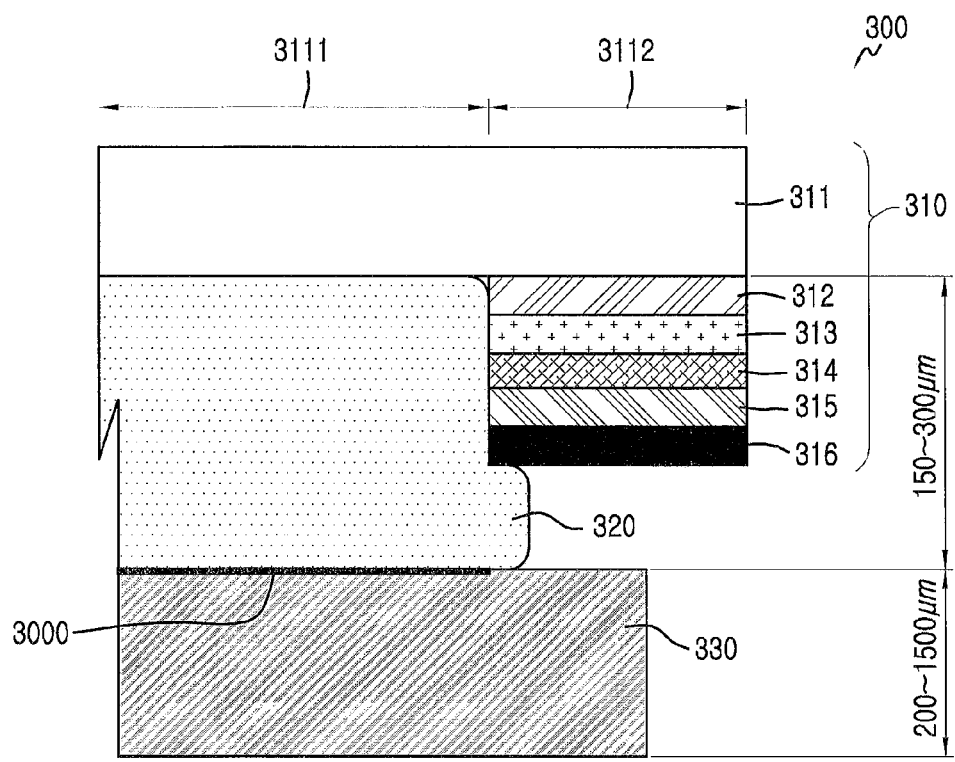
FIG. 3 illustrates a partial cross-sectional view of a display device according to an embodiment of the present disclosure.

FIG. 3 illustrates a partial cross-sectional view of a display device according to an embodiment of the present disclosure. Referring to FIG. 3, the display device 300 may include a window 310, a transparent adhesive layer 320, and a display panel 330.

The window 310 may include a transparent plate 311, an adhesive layer 312, a plastic film 313, a pattern layer 314, a metal layer 315, and a light blocking layer 316.

The transparent plate 311 may be flat and be disposed on the upper portion of the display panel 330, and form the front surface of the electronic device 100. The transparent plate 311 may be a quadrangle. The transparent plate 311 may protect the display panel 330 and allow an image displayed on the display panel 330 to be shown to the outside. The transparent plate 311 may be formed of plastic such as acrylic that includes impact resistance or glass. The transparent plate 311 may be formed of reinforced glass.

The adhesive layer 312 may be disposed between the transparent plate 311 and the plastic film 313, and attach the plastic film 313 to the transparent plate 311. The adhesive layer 312 may be disposed in the lower peripheral region (ex: quadrangular band region) of the transparent plate 311. The adhesive layer 312 may not overlap a view area 3000 (area of the display panel 330 where an image is displayed). The adhesive layer 312 may be transparent. The adhesive layer 312 may be dyed using dyes, color, pigment, fluorescent material, or phosphor, and the like The adhesive layer 312 may include a Pressure Sensitive Adhesive (PSA).

The plastic film 313 may be attached to the lower peripheral region of the transparent plate 311 by the medium of the adhesive layer 312. The plastic film 313 may be a band shape corresponding to the lower peripheral region of the transparent plate 311. The plastic film 313 may not overlap the view area 3000. The plastic film 313 may be transparent. The plastic film 313 may be formed of a material that includes high thermal stability and high mechanical strength. The plastic film 313 may be a polyethyleneterephthalate (PET) film, a Polycarbonate (PC) film, a Polyethylene (PE) film, a Polypropylene (PP) film, and the like.

The pattern layer 314 may include various patterns (ex: plane pattern or three dimensional pattern) attached or printed on the backside of the plastic film 313. The pattern layer 314 may not overlap the view area 3000. The pattern layer 314 may be formed via Ultraviolet (UV) molding. UV solution is coated on the surface of the plastic film 313, has a pattern via a mold, and may be hardened by UV. The plastic film 313 may have a characteristic of having strong adhesive force with respect to UV solution. The pattern layer 314 formed via UV molding may have a pattern corresponding to the pattern formed in the mold. The pattern of the mold may be formed via mechanical processing, laser processing, or photolithography, and the like. The laser processing may form a pattern by melting and evaporating the inner surface of a mold using a laser of high heat. The photolithography may form a pattern via deposition, coating, exposure, development, and etching processes using a pattern mask that includes a photosensitive characteristic. The pattern layer 314 is illuminated by external light and may express metal texture. The pattern of the pattern layer 314 may be a hairline. Since the pattern layer 314 is disposed under the transparent plate 311 that includes a predetermined thickness, the pattern of the pattern layer 314 may appear in three dimensions via the transparent plate 311.

The metal layer 315 may be attached to the backside of the pattern layer 314. The metal layer 315 may not overlap the view area 3000. The metal layer 315 may be formed by depositing and coating metal (ex: Sn, Al, Si, Ti, TiC, TiN, TiCB, or $Al_2O_3$, and the like) on the backside of the pattern layer 314. For example, the metal layer 315 may be formed via Physical Vapor Deposition (PVD) or Chemical Vapor Deposition (CVD). The metal layer 315 may be illuminated by external light and may express metal texture. Since the metal layer 315 is disposed under the transparent plate 311 that includes a predetermined thickness, the pattern of the metal layer 315 may appear in three dimensions via the transparent plate 311.

A region 3112 of the transparent plate 311 that does not correspond to the view area 3000 may be expressed as metal material due to the pattern 314 and the metal layer 315.

The light blocking layer 316 may be formed on the backside of the metal layer 315. The light blocking layer 316 may block external light illuminated to the peripheral region of the transparent plate 311. The light blocking layer 316 may prevent light from the display panel 330 from being illuminated to the peripheral region of the transparent plate 311. The light blocking layer 316 may include a black component absorbing light without reflecting light. The light blocking layer 316 may be a layer printed in black. The light blocking layer 316 may be an adhesive including a black component. The light blocking layer 316 may include a black film and a material of an adhesive component.

The transparent adhesive layer 320 may fill between the window 310 and the display panel 330. The window 310 and the display panel 330 may be got together by the transparent adhesive layer 320. The transparent adhesive layer 320 may fill a space between the transparent plate 311 and the display panel 330. The transparent adhesive layer 320 may extend between the light blocking layer 316 and the display panel 330. The transparent adhesive layer 320 may allow an image displayed on the view area 3000 of the display panel 330 to penetrate to the transparent plate 311 of the window 310. The image displayed on the view area 3000 of the display panel 330 may be shown via a region 3111 of the transparent plate 311 corresponding to the view area 3000. The window 310 and the display panel 330 may not be separated from each other. Here, the transparent adhesive layer 320 may fill only a space (recess) of the window 310 where the adhesive layer 312, the plastic film 313, the pattern layer 314, the metal layer 315, and the light blocking layer 316 have not been installed. The transparent adhesive layer 320 may be formed of a material that may raise visibility of an image from the display panel 330 by suppressing irregular reflection. The transparent adhesive layer 320 may be Super View Resin (SVR). The transparent adhesive layer 320 may have a thickness of 150~300 μm.

The display panel 330 may be attached to the transparent adhesive layer 320 and disposed under the light blocking layer 316. The display panel 330 may be separated from the light blocking layer 316 or may adhere to the light blocking layer 316. The display panel 330 may display a signal transmitted from the primary circuit board 400 in the form of an image. The display panel 330 may be a Liquid Crystal Display (LCD) or an Active-Matrix Organic Light Emitting Diode (AMOLED), and the like. The display panel 330 may be implemented to be flexible, transparent, or wearable. The display panel 330 may have a thickness of 200~1500 μm.

Figure 4:
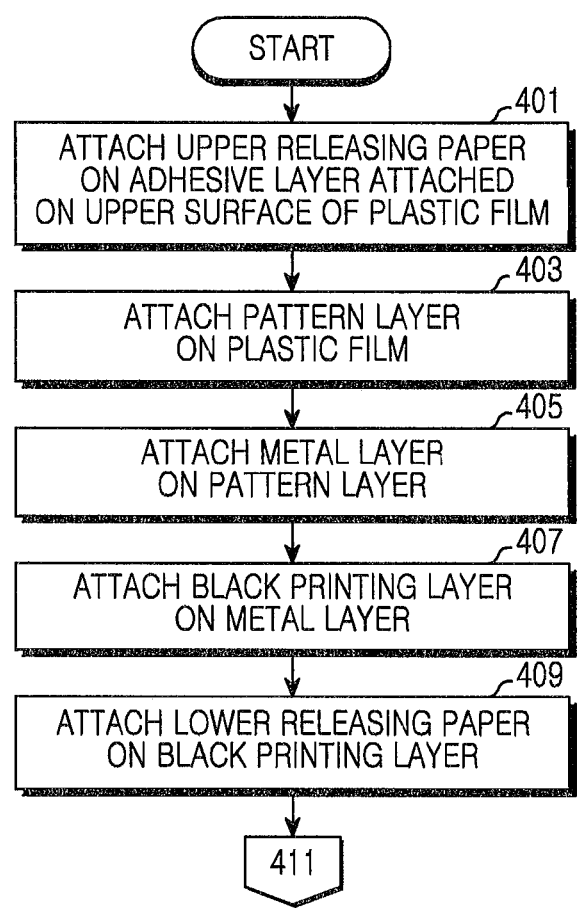
FIG. 4 illustrates a process of a process of a pattern film manufacturing procedure according to an embodiment of the present disclosure.

FIG. 4 illustrates a process of a pattern film manufacturing procedure according to an embodiment of the present disclosure.

Referring to FIG. 4, an upper release paper (or a release film) may be attached on an adhesive layer (surface) (ex: PSA) attached on the upper surface of the plastic film (ex: a PET film, a PC film, a PE film, or a PP film, and the like) in operation 401. The release paper may protect the adhesive layer attached on the upper surface of the plastic film, and may be easily separated when the adhesive layer is used.

In operation 403, a pattern layer may be attached on the backside of the plastic film (ex: a PET film, a PC film, a PE film, or a PP film). The pattern layer may be formed on the plastic film via UV molding.

In operation 405, a metal layer may be attached on the pattern layer. Metal (ex: Sn, Al, Si, Ti, TiC, TiN, TiCB, or Al$_2$O$_3$, and the like) may be deposited on the backside of the pattern layer via PVD.

In operation 407, a black printing layer may be attached on the metal layer.

In operation 409, a lower release paper may be attached on the black printing layer.

Figure 5:
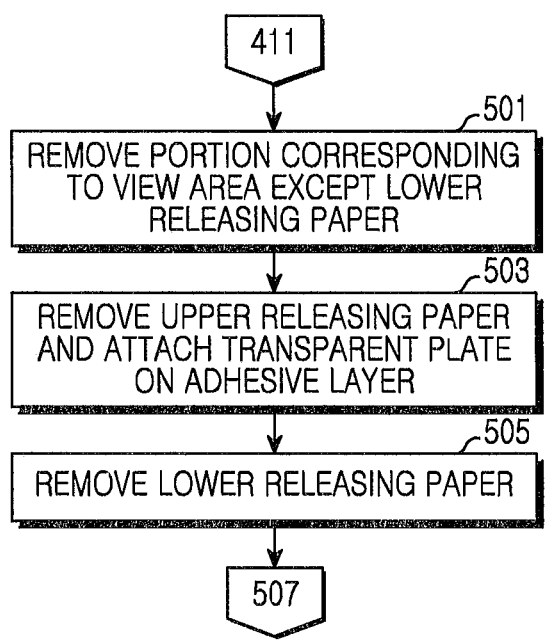
FIG. 5 illustrates a process of a process for manufacturing a window for a display panel according to an embodiment of the present disclosure.

FIG. 5 illustrates a process for manufacturing a window for a display panel according to an embodiment of the present disclosure.

Referring to FIG. 5, a portion of the pattern film manufactured via the processes of FIG. 4 corresponding to the view area except the lower release paper may be removed in operation 501. The portion corresponding to the view area may be blanked via laser cutting and then separated.

In operation 503, a remaining upper release paper is removed, and a transparent plate may be attached on the adhesive layer of the pattern film. Heat or pressure is applied, such that the pattern layer of the pattern film, the metal layer, and the black printing layer may be transferred (ex: room-temperature transfer or heat transfer) to the transparent plate.

In operation 505, the lower release paper may be removed.

Figure 6:
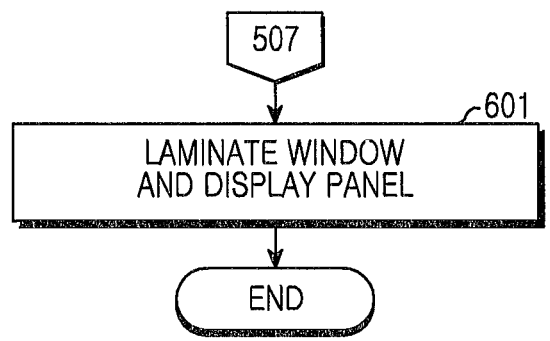
FIG. 6 illustrates a process of a process for manufacturing a display device according to an embodiment of the present disclosure.

FIG. 6 illustrates a process for manufacturing a display device according to an embodiment of the present disclosure.

Referring to FIG. 6, the window and the display panel manufactured via the processes of FIG. 5 may be got together. The display panel may be disposed under the window, and a transparent adhesive layer (ex: SYR) may fill a space between the window and the display panel. The transparent adhesive layer may fill a space between the transparent plate of the window and the display panel. The transparent adhesive layer may extend between the light blocking layer and the display panel.

FIGS. 7A to 7G illustrate views of a process for manufacturing a display device according to an embodiment of the present disclosure.

Figure 7A:
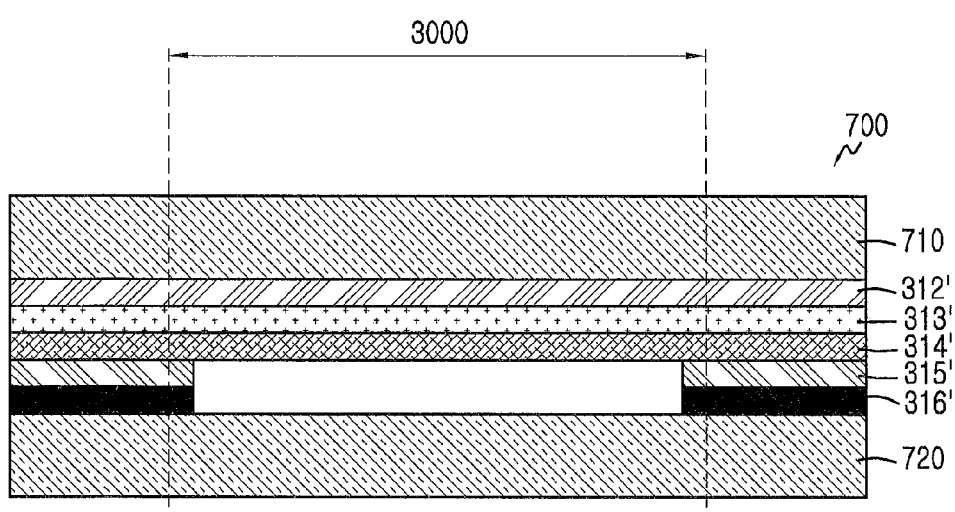
FIGS. 7A to 7G illustrate views of a process for manufacturing a display device according to an embodiment of the present disclosure.

Referring to FIG. 7A, a pattern film 700 may include an upper release paper 710, an adhesive layer 312', a plastic film 313', a pattern layer 314', a metal player 315', a black printing layer 316', and a lower release paper 720. The adhesive layer (surface) 312' (ex: PSA) may be attached on the upper surface of the plastic film 313' (ex: a PET film, a PC film, a PE film, or a PP film, and the like). The upper release paper (or a release film) 710 may be attached on the adhesive layer 312'. The pattern layer 314' may be attached on the backside of the plastic film 313' (ex: a PET film, a PC film, a PE film, or a PP film). The pattern layer may be formed on the plastic film via UV molding. The metal layer 315' may be attached on the backside of the pattern layer 314'. Metal (ex: Sn, Al, Si, Ti, TiC, TiN, TiCB, or Al$_2$O$_3$, and the like) may be attached on the backside of the pattern layer 314' via PVD. The black printing layer 316' may be formed on the backside of the metal layer 315'. The lower release paper 720 may be attached on the backside of the black printing layer 316'. The pattern layer 314' or the metal player 315' or the black printing layer 316' may overlap at least a portion of the view area 3000.

Figure 7B:
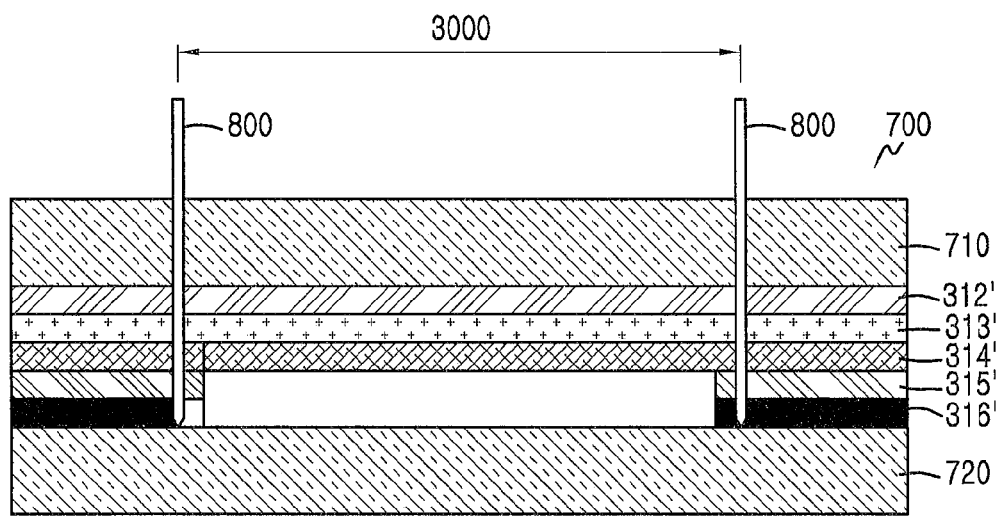
Figure 7C:
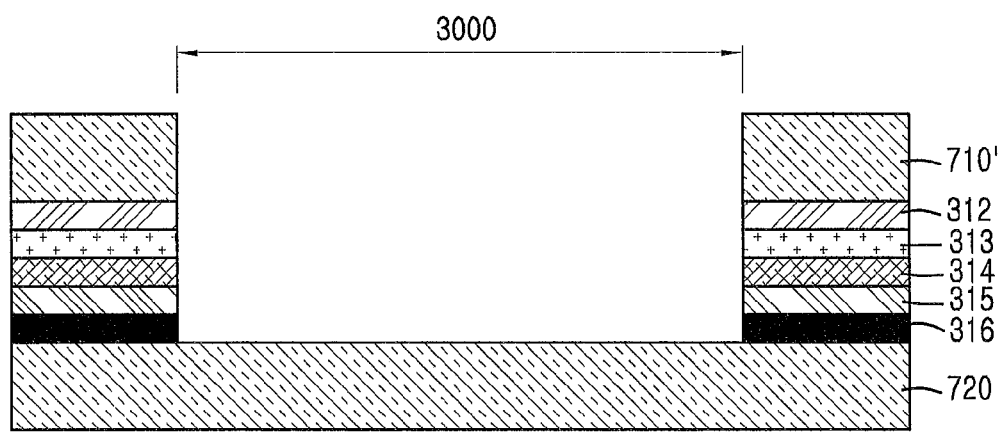

Referring to FIGS. 7B and 7C, a portion of the pattern film 700 corresponding to the view area 3000 except the lower release paper 720 may be removed. The portion corresponding to the view area 3000 may be blanked via laser cutting and then separated. The remaining adhesive layer 312, the plastic film 313, the pattern layer 314, the metal layer 315, and the black printing layer 316 may correspond to the peripheral region (ex: quadrangular band region) of the screen of the electronic device 100.

Figure 7D:
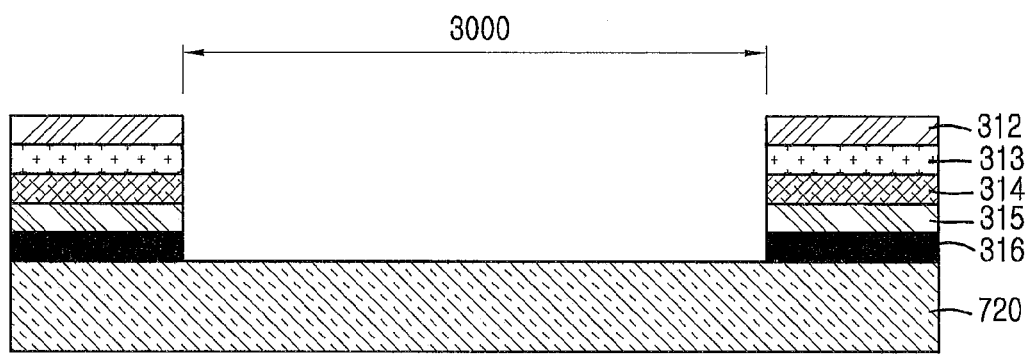
Figure 7E:
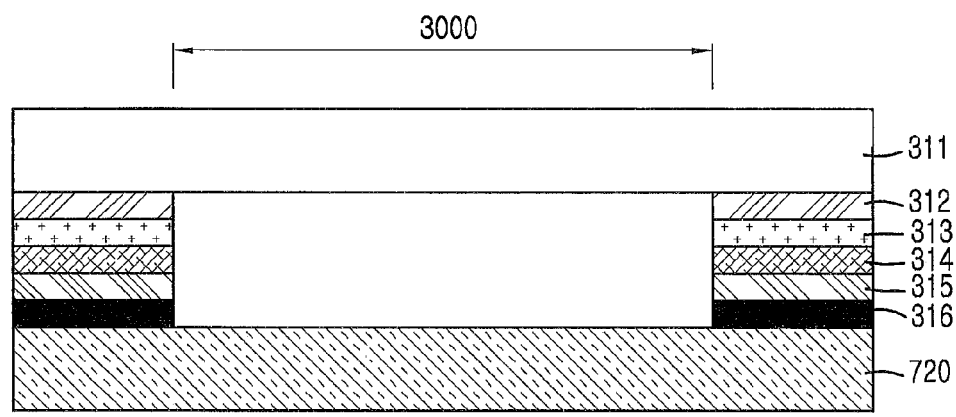
Figure 7F:
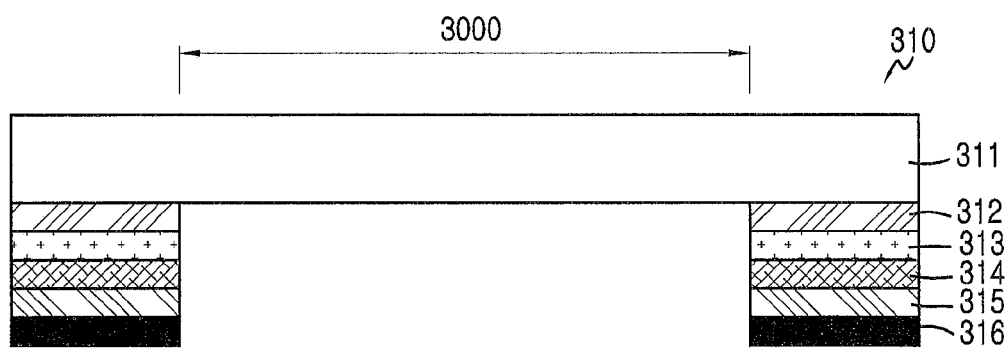

Referring to FIGS. 7D to 7F, the remaining upper release paper 710' is removed, and the transparent plate 311 may be attached on the remaining adhesive layer 312. The lower release paper 720 may be removed and the window 310 may be completed. Heat or pressure is applied, such that the pattern layer 314, the metal layer 315, and the black printing layer 316 may be transferred (ex: room-temperature transfer or heat transfer) to the transparent plate 311.

Figure 7G:
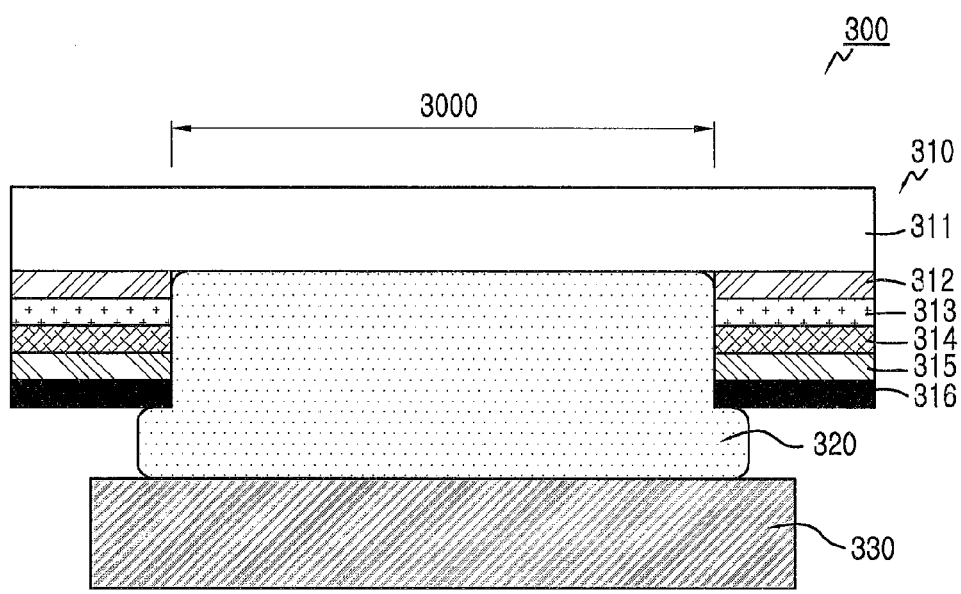

Referring to FIG. 7G, the display device 300 may be completed by lamination between the window 310 and the display panel 330. The display panel 330 may be disposed under the window 310, and the transparent adhesive layer (ex: SVR) 320 may fill a space between the window 310 and the display panel 330. The transparent adhesive layer 320 may fill a space between the transparent plate 312 of the window 310 and the display panel 330. The transparent adhesive layer 320 may extend between the black printing layer 316 and the display panel 330.

Figure 8:
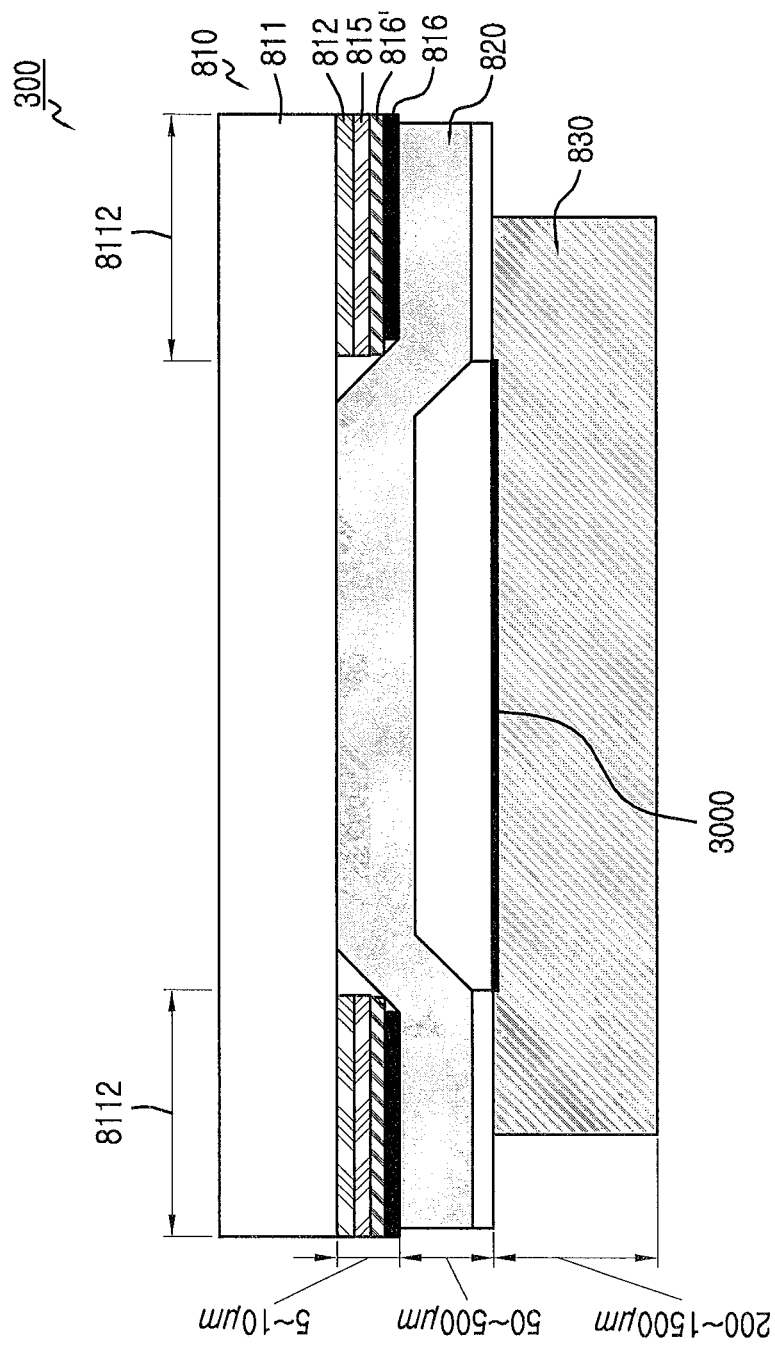
FIG. 8 illustrates a partial cross-sectional view of a display device according to an embodiment of the present disclosure.

FIG. 8 illustrates a partial cross-sectional view of a display device according to an embodiment of the present disclosure. Referring to FIG. 8, the display device 300 may include a window 810, a touch sheet 820, and a display panel 830.

The window 810 may include a transparent plate 811, an adhesive layer 812, a metal layer 815, a pattern layer 816', and a light blocking layer 816.

The transparent plate 811 is flat, is disposed on the display panel 830, and may form the front surface of the electronic device 100. The transparent plate 811 may be a quadrangle. The transparent plate 811 may protect the display panel 830, and allow an image displayed on the display panel 830 to be shown to the outside. The transparent plate 811 may be formed of plastic such as acrylic having impact resistance or glass. The transparent plate 811 may be formed of reinforced glass.

The adhesive layer 812 may be disposed between the transparent plate 811 and the metal layer 815, and attach the metal layer 815 to the transparent plate 811. The adhesive layer 812 may be disposed on the lower peripheral region (ex: quadrangular band region) of the transparent plate 811. The adhesive layer 812 may not overlap the view area 3000 (area of the display panel 830 where an image is displayed). The adhesive layer 812 may include a PSA.

The metal layer 815 may be attached to the backside of the transparent plate 811 by the medium of the adhesive layer 812. The metal layer 815 may not overlap the view area 3000. The metal layer 815 may be formed by depositing or coating metal (ex: Sn, Al, Si, Ti, TiC, TiN, TiCB, or $Al_2O_3$, and the like) on the backside of the transparent plate 811 on which the adhesive layer 812 has been attached. The metal layer 815 may be illuminated by external light and express metal texture.

The pattern layer 816' may include a pattern printed on the backside of the metal layer 815. The patter layer 816' may not overlap the view area 3000.

The light blocking layer 816 may be formed on the backside of the pattern layer 816'. The light blocking layer 816 may block external light illuminated to the peripheral region of the transparent plate 811. The light blocking layer 816 may block light from the display panel 830 illuminated to the peripheral region of the transparent plate 811. The light blocking layer 816 may be a layer printed in black that does not reflect light but absorbs light. The light blocking layer 816 may be an adhesive including a black component. The total thickness of the metal layer 815, the pattern layer 816', and the light blocking layer 816 may be 5~10 μm.

A peripheral region 8112 of the transparent plate 811 that does not correspond to the view area 3000 may be expressed by metal material due to the metal layer 815, the pattern layer 816', and the light blocking layer 816.

The touch sheet (transparent adhesive layer) 820 may be used for receiving a touch. The touch sheet 820 may be a transparent conductive layer and be attached (deposited) on the backside of the transparent plate 811 where a plurality of layers 812, 815, 816', 816 have not been attached. The touch sheet 820 may extend to the backside of the light blocking layer 816. The touch sheet 820 may be an Indium Tin Oxide (ITO) sheet. The thickness of the touch sheet 820 may be 50~1500 μm.

The display panel 830 may be flat and be disposed under the touch film 820. The peripheral region of the display panel 830 may be attached on the touch film 820. The view area 3000 of the display panel 830 may be separated from the touch film 820. The display panel 830 may be an LCD or an AMOLED, and the like. The thickness of the display panel 830 may be 200~1500 μm.

According to an embodiment of the present disclosure, the display device 300 may include the flat transparent plate 311, the display panel 330 spaced under the transparent plate 311, at least one film (ex: the adhesive layer 312, the plastic film 313, the pattern layer 314, the metal layer 315 or the light blocking layer 316) disposed between the transparent plate 311 and the display panel 330, and attached on the peripheral region of the transparent plate 311, and the transparent adhesive layer 320 disposed between the transparent plate 311 and the display panel 330, and laminating the transparent plate 311 and the display panel 330.

According to an embodiment of the present disclosure, the transparent adhesive layer 320 may fill a space between the transparent plate 311 and the display panel 330.

According to an embodiment of the present disclosure, the transparent adhesive film 320 may extend between at least one film (ex: the adhesive layer 312, the plastic film 313, the pattern layer 314, the metal layer 315 or the light blocking layer 316) and the display panel 330.

According to an embodiment of the present disclosure, the transparent adhesive layer 320 may include an SYR.

According to an embodiment of the present disclosure, at least one film (ex: the adhesive layer 312, the plastic film 313, the pattern layer 314, the metal layer 315 or the light blocking layer 316) may not overlap the view area 3000 of the display panel 330.

According to an embodiment of the present disclosure, at least one film (ex: the plastic film 313) may include one of a PET film, a PC film, a PE film, and a PP film.

According to an embodiment of the present disclosure, at least one film may include the pattern layer 314 that includes a predetermined pattern.

According to an embodiment of the present disclosure, the pattern layer 314 may be formed via UV molding.

According to an embodiment of the present disclosure, at least one film may include the metal layer 315.

According to an embodiment of the present disclosure, the metal layer 315 may be formed via PVD or CVD.

According to an embodiment of the present disclosure, at least one film may include the black light blocking layer 316.

According to an embodiment of the present disclosure, the display device 300 may include the adhesive layer 312 (ex: PSA) laminating the transparent plate 311 and at least one film.

According to an embodiment of the present disclosure, the transparent adhesive layer 320 may be an ITO sheet (ex: the touch sheet 820).

According to an embodiment of the present disclosure, the ITO sheet (ex: touch sheet 820) may be attached on the backside of the transparent plate 311 and include a portion spaced from the display panel 330.

Although the disclosure has been shown and described with reference to certain example embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A display device comprising:
a transparent plate comprising a view area and a peripheral area;
a display panel disposed below the transparent plate; and
a touch sheet and at least one film interposed between the transparent plate and the display panel;
wherein the touch sheet is directly attached to a rear-surface of the view area, and the at least one film is directly attached to a rear-surface of the peripheral area,
wherein the touch sheet extending to the peripheral area with a same thickness as the view area such that the touch sheet is disposed under a rear-surface of the at least one film,
wherein the touch sheet includes a first region attached to the transparent plate, a second region attached to a back surface of the at least one film, and at least one inclined region disposed between the first region and the second region, and at least part of the at least one inclined region overlaps with the view area,
wherein a distance between the display panel and a rear surface of the first region is greater than a distance between the display panel and a rear surface of the second region so that the first region of the touch sheet is separated from a view area of the display panel, and
wherein the at least one film comprises:
an adhesive layer formed on a plastic film, the adhesive layer directly attached to the transparent plate at the peripheral area;
a pattern layer formed on the plastic film, the pattern layer disposed below the adhesive layer; and
a black light blocking layer disposed below the pattern layer, the black light blocking layer forming the rear-surface of the at least one film.

2. The display device of claim 1, further comprising a transparent adhesive layer disposed between the display panel and the touch sheet in the view area of the display panel.

3. The display device of claim 2, wherein the transparent adhesive layer extends to the peripheral area.

4. The display device of claim 2, wherein the transparent adhesive layer is a Super View Resin (SVR).

5. The display device of claim 1, wherein the at least one film does not overlap the view area of the display panel.

6. The display device of claim 1, wherein the pattern layer comprises a predetermined pattern, and
wherein the plastic film comprises one of a polyethyleneterephthalate (PET) film, a Polycarbonate (PC) film, a Polyethylene (PE) film, a Polypropylene (PP) film.

7. The display device of claim 6, wherein the pattern layer is formed via Ultraviolet (UV) molding.

8. The display device of claim 1, wherein the at least one film further comprises a metal layer interposed between the pattern layer and the black light blocking layer.

9. The display device of claim 8, wherein the metal layer is formed via Physical Vapor Deposition (PVD) or Chemical Vapor Deposition (CVD).

10. The display device of claim 1, wherein the adhesive layer laminates the transparent plate and the at least one film.

11. The display device of claim 10, wherein the adhesive layer is a Pressure Sensitive Adhesive (PSA).

12. The display device of claim 1, wherein the touch sheet comprises an Indium Tin Oxide (ITO) sheet.

13. The display device of claim 12, wherein the touch sheet is spaced from the display panel at a portion of the view area,
further comprising a transparent adhesive layer filled a space between the touch sheet and the display panel.

* * * * *